(12) United States Patent
Neier

(10) Patent No.: US 6,203,185 B1
(45) Date of Patent: *Mar. 20, 2001

(54) FEED MIXER HAVING THIRD AUGER AND METHOD FOR USING

(75) Inventor: Benjamin R. Neier, Dodge City, KS (US)

(73) Assignee: J-Star Industries, Inc., Ft. Atkinson, WI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/157,459

(22) Filed: Sep. 21, 1998

(51) Int. Cl.[7] .............................. B02C 18/22; B02C 19/22
(52) U.S. Cl. ....................... 366/156.2; 366/297; 366/299; 366/603; 241/101.2; 241/101.76; 241/605
(58) Field of Search .............................. 241/101.1, 101.2, 241/101.76, 605, 260.1; 366/297–300, 319, 324, 603, 156.2, 156.1

(56) References Cited

U.S. PATENT DOCUMENTS

| 3,421,740 | * | 1/1969 | Behrens ................................ 366/298 |
| 3,797,807 | * | 3/1974 | Behrens ................................ 366/298 |
| 3,972,484 | * | 8/1976 | Ryan . |
| 4,083,501 | * | 4/1978 | Ryan ............................. 241/101.762 |
| 4,151,961 | * | 5/1979 | Mokofka et al. ............... 241/101.76 |
| 4,597,672 | * | 7/1986 | Neier et al. ........................... 366/603 |
| 5,143,310 |   | 9/1992 | Neier . |

* cited by examiner

Primary Examiner—Tony G. Soohoo
(74) Attorney, Agent, or Firm—Zarley, McKee, Thomte, Voorhees & Sease

(57) ABSTRACT

A feed mixer comprising a plurality of mixing members wherein each mixing member is longitudinally mounted for rotation about an axis and the mixing members further comprises a chopper auger and a shredding auger, each having a flighting. In addition, the mixing members may also comprise a third mixing auger having a flighting. The auger flightings may further provide chopping knives, or sickle knives, on the outer peripheral edge of the flightings.

12 Claims, 2 Drawing Sheets

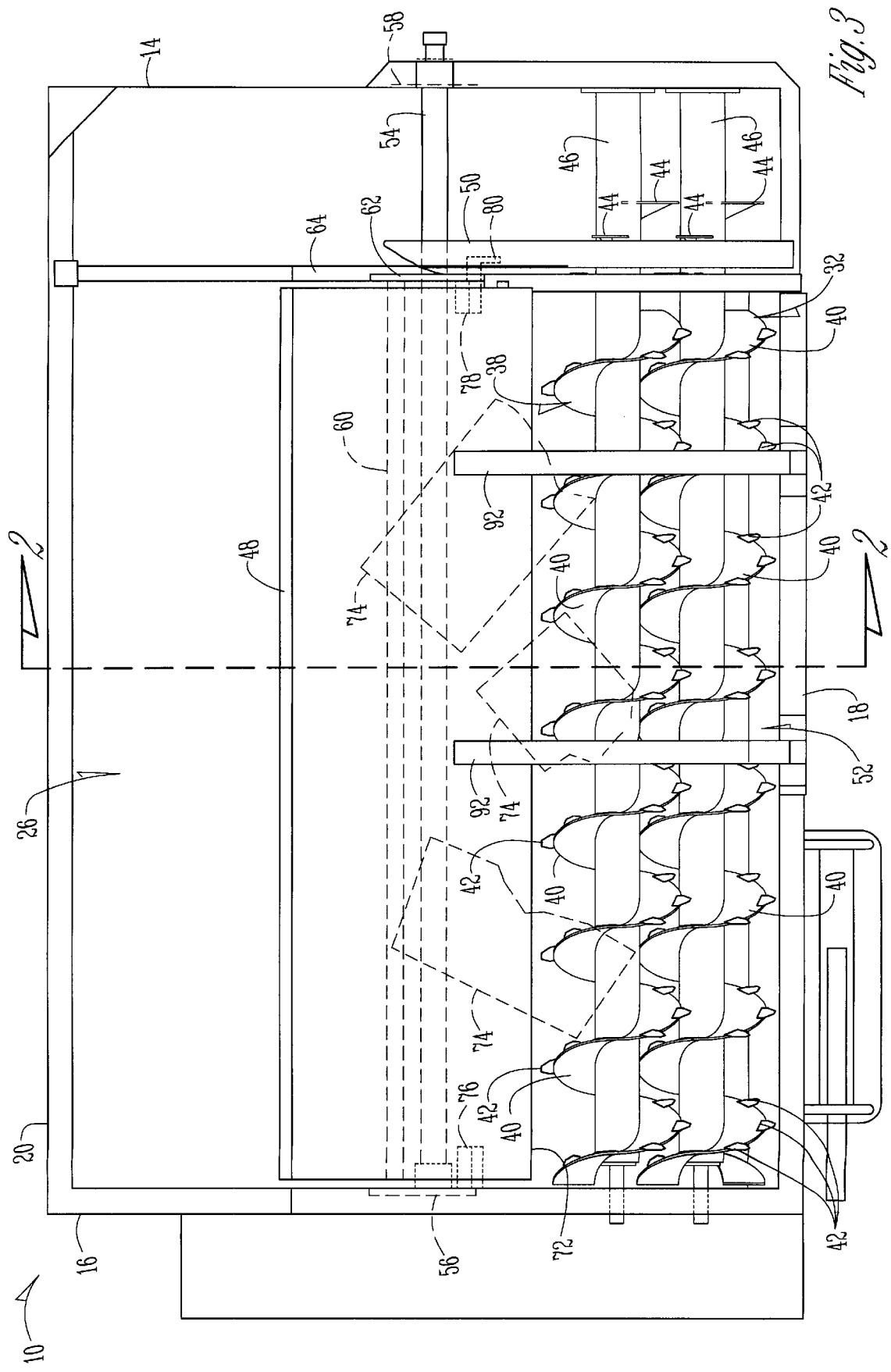

FEED MIXER HAVING THIRD AUGER AND METHOD FOR USING

BACKGROUND OF THE INVENTION

Forage and grain crops are common components of livestock feed. While these components may be utilized independently, it is frequently preferable to provide a mixture of feed stuff such as hay with grain or other fluent materials. Several mixers have been developed for this purpose. A very successful mixer for fluent and non-fluent material is disclosed in previously issued patents of which I am a co-inventor or sole inventor, U.S. Pat. No. 4,506,990, issued Mar. 26, 1985; U.S. Pat. No. 4,597,672, issued Jul. 1, 1986 and U.S. Pat. No. 4,756,626, issued Jul. 12, 1988. The mixers of these patents include a rotor and a main mixing chamber next to vertically stacked augers in an auxiliary side chamber. The material is moved from one end of the auxiliary chamber to the other in opposite directions and is continuously cycled from the main chamber into the auxiliary chamber. The mixing action is more extensively described in these patents.

The mixer of these patents will mix fluent material with non-fluent material such as hay. Hay is more difficult to mix with fluent material as it is necessary that the hay be left in the mixer for extended periods of time until it has been sufficiently chopped or shredded. Also, it is often desirable to put hay bales of varying sizes into the mixer for mixing with the fluent materials. I invented an improved mixer that would allow for a faster more efficient way of chopping or processing baled hay of different sizes with the fluent materials. This improved mixer is the subject of U.S. Pat. No. 5,143,310, issued Sep. 1, 1992.

While the prior art mixers supply an efficient means for mixing average amounts of fluent with non-fluent material, there remains a need to maintain an efficient mixing and cutting process that does not damage fragile ingredients, such as flaked or high moisture corn. This is of critical importance to the operators of large livestock operations (large operators).

Larger conventional auger mixers tend to damage certain fragile feed ingredients even more than small to medium size auger mixers. This tendency to damage fragile feed ingredients is due at least in part to the additional time required for mixing and unloading. While the prior art mixers described above greatly reduced or eliminated the amount of damage to fragile ingredients such as flaked or high moisture corn, the capacity of these mixers is limited. If the recommended capacity of these mixers is surpassed, the quality of mixing and the speed of mixing is reduced. In addition, the material to be mixed must remain in the mixer for longer periods of time thus increasing the damage potential to fragile ingredients. What is needed is a feed mixer that maintains high quality and efficiency of mixing while greatly reducing or eliminating damage to fragile feed ingredients such as flaked or high moisture corn. In addition, what is needed is a means for allowing larger quantities of hay at a time to be loaded into this mixer and a means to cut and/or shred this hay so that a large amount of feed can be mixed quickly without the need to keep the hay and feed mix in the mixer for long periods of time in an effort to fully homogenize the hay.

Therefore a primary object of the present invention is the provision of an improved feed mixer.

A further object is the provision of a feed mixer which allows larger quantities of hay to be loaded into the mixer and cut or shred.

A further object of the present invention is to increase the speed of introduction of hay into the mixer while at the same time permitting full homogenization of the hay into the other feed ingredients.

A further object of the present invention is to increase the quality and efficiency of the mixer while at the same time reducing damage to fragile feed ingredients such as flaked or high moisture corn.

A further object of the present invention is the provision of an improved mixer which is economical to manufacture, durable in use, and efficient in operation.

SUMMARY OF THE INVENTION

By adding an additional auger above the standard upper side auger, the present invention permits the addition of hay at a faster rate than with prior art mixers. This third auger is equipped with knives along its outer edges to shred hay as it is fed in through the hay processor. In addition, this new third auger, or shredding auger, is capable of rotating upon its axis at a higher speed than the original chopper auger. This has the additional advantage of shredding the hay quickly into a homogeneous, high quality feed mix ration. Also, the position of the third auger, the shredding auger, allows for an unexpected improvement in the ability to load more hay at a time due to the larger opening combined with the quick shredding and chopping capability of the double auger combination at the top of the feed mixer.

The feed mixer comprises a housing forming a mixing chamber having opposite end walls, side walls, a bottom wall and an upwardly facing opening. First, second, and third augers are mounted within the mixing chamber for rotation about first, second and third axes respectively. The third axis is above the first and second axes and the second axis is above the first axis. A rotor is mounted in the mixing chamber for rotation about a rotor axis positioned laterally from the first, second, and third axis. An ingredient feeder is positioned adjacent the third auger for feeding ingredients into the mixing chamber adjacent the third auger. A drive system rotates the first, second and third augers and the rotor about their respective first, second, third, and rotor axis.

The triple auger feed mixer of this invention is adaptable for use on not only the mixer disclosed in this application, but also to feed mixers of a more conventional design.

BRIEF DESCRIPTION OF THE DRAWINGS

FIG. 3 is a top plan view of FIG. 1. This view better shows the shredding auger and the chopper auger wherein both augers have attached knives.

DETAILED DESCRIPTION OF THE PREFERRED EMBODIMENT

Figure 1:
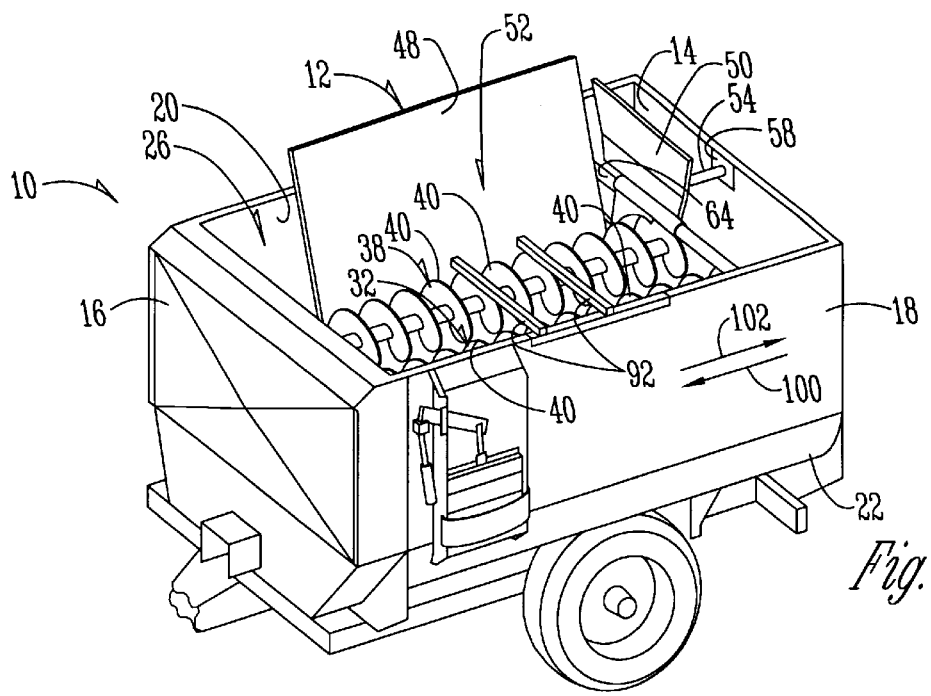
FIG. 1 is a perspective view of a feed mixer which includes the chopper and shredding augers of this invention.

A mixer 10 is shown in FIG. 1 which includes a hay feed system attachment 12, a shredding auger 38 and a chopper auger 32.

Figure 2:
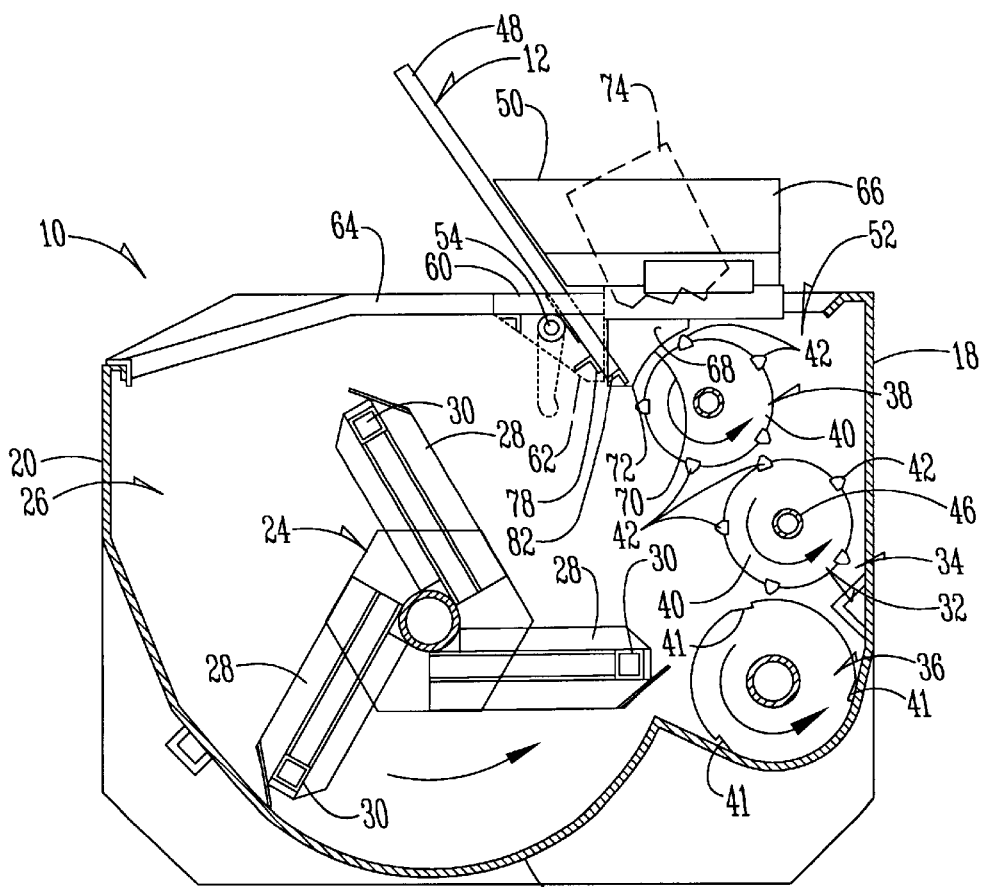
FIG. 2 is a cross sectional view taken along line 2—2 in FIG. 3. This view shows the three augers in the hay chopping chamber and rotor in the mixing chamber.

The mixer 10 includes opposite end walls 14 and 16, opposite side walls 18 and 20 and a bottom wall 22. FIG. 2 shows a rotor 24 positioned in a main chamber 26 and includes rotor arms 28 which have rotor bars 30 extending therebetween. A chopping auger 32 is positioned in an auxiliary chamber 34 above a lower mixing auger 36. The lower mixing auger 36 further having a flighting 40 wherein the outer edge of the flighting 40 may have spaced apart notches 41 with a spacing of one or more notches for each 360°. The chopper auger 32 also includes a flighting 40 having spaced apart sickle knives 42 on the outer edge of the flighting 40 with a spacing of one or more knives for each 360°. A shredding auger 38 having a flighting 40 is positioned in the hay chopping chamber 52 above and somewhat to the side of the chopper auger 32 so that the flightings 40 of the shredding auger 38 and the chopper auger 32 may be operationally overlapping when viewed from above as in FIG. 3. The flighting 40 of the shredding auger 38 also includes spaced apart sickle knives 42 on the outer edge of the flighting 40 with a spacing of one or more knives for each 360°. Paddles 44 are provided on the shafts 46 of the chopper auger 32 and the shredding auger 38 as seen in FIG. 3 for stirring the material and distributing it throughout the mixing chambers 26 and 34.

The hay feed system attachment 12 includes a feed wall 48 extending longitudinally of the mixer 10 and a control wall 50 extending laterally of the auxiliary chamber 34 to define in cooperation with the side wall 18 a hay chopping chamber 52 as seen in FIG. 3. The hay chopping chamber 52 is in the upper region of the auxiliary chamber 34 where the chopper auger 32 is positioned.

As seen in FIG. 3, the feed wall 48 is mounted on a pivot shaft frame member 54 extending between the opposite end walls 14 and 16 of the mixer 10. A mounting end plate 56 secures the pivot shaft 54 to the end wall 16 and a mounting plate 58 connects the opposite end to the end wall 14. A second longitudinal frame member 60 extends between the mounting end plate 56 and a support plate 62 through which the pivot shaft 54 extends as seen in FIG. 3. The support plate 62 is connected to a transversely extending frame member 64 extending between the mixer side walls 18 and 20. The control wall 50 is pivotally mounted on the frame member 64 and includes an upper portion 66 and a lower portion 68 which includes a concave downwardly edge 70 to conform to the convex shape of the shredding auger 38 as seen in FIG. 2. The lower edge 72 of the feed wall 48 is also positioned closely adjacent to the periphery of the shredding auger 38 to assure that hay bales 74 are fed through the shredding auger 38 and the chopper auger 32 before the hay reaches the lower mixing auger 36 or rotor 24.

FIG. 3 shows that a stop 76 is provided on the mounting end plate 56 and a stop 78 is provided on the support plate 62 to limit pivotal movement of the feed wall 48 beyond the upstanding position illustrated in the drawings. It is seen, however, that the feed wall 48 extends downwardly and laterally towards the side wall 18 and the shredding auger 38. A stop plate 80 extends laterally outward from the support plate 62 to limit pivotal movement to the control wall 50 beyond a substantially vertical position.

The lower corner of the feed wall 48 adjacent to the control wall 50 engages the lower portion 68 of the control wall 50 when the feed wall 48 and control wall 50 are both in their horizontal positions. Pivotal movement to a raised position of the feed wall 48 causes the control wall 50 to also pivot to a substantially vertical position. A block 82 is mounted on the lower corner of the feed wall 48 and provides the contact with the lower portion 68 of the control wall 50 as seen in FIG. 2. Operation of the pivoting of the feed wall 48 and control wall 50 can be accomplished through use of a winch and cable or a hydraulic cylinder. Further, the feed wall 48 and the control wall 50 may be constructed in a fixed vertical position.

The following factors affect the desired amount of chopping action on the hay bales 74 when in the hay chopping chamber 52: the rotational speed of the shredding auger 38 and the chopper auger 32; the number of sickle knives 42 used on each 360° rotation of the flighting 40 of the shredding auger 38 and chopping auger 32; the pitch of the flightings 40 which affects the length of time the hay is in the hay chopping chamber 52; the outer diameter of the flightings 40; and the diameter of the tubing on which the auger flightings are mounted. Preferably, the shredding auger 38 turns at a higher speed than the chopper auger 32 ensuring that the hay bales 74 are processed quickly into a homogenous, high quality feed ingredient. A pair of control arms 92 are removably mounted on the top edge of the side wall 18 and extend over the shredding auger 38 and the chopper auger 32 to restrict overly fast loading of the hay to the shredding auger 38 and the chopper auger 32. The control wall 50 restricts flow of hay over the top of the shredding auger 38 and the chopper auger 32. Once the hay has been chopped into small enough pieces to pass through the shredding auger 38 and the chopper auger 32 or under the control wall 50, it is acted upon by the paddles 44 as seen in FIG. 3 where upon it is distributed downwardly to the mixing auger 36 and laterally into the main chamber 26 for further mixing action by the rotor 24.

The addition of a novel third auger, the shredding auger 38, results in significantly faster homogenization than the prior art feed mixers. Rotating the shredding auger 38 faster than the chopper auger 32 is preferred, and this also enhances faster homogenization. As seen in FIG. 3, the position of the shredding auger 38 in conjunction with that of the chopper auger 32 allows for more exposed shredding and chopping surface thus providing for a faster processing time. This novel combination of a shredding auger 38 and a chopper auger 32 juxtaposed within the hay chopping chamber 52 provides the unexpected advantage of more physical space within which to load hay bales 74, thus allowing many different sizes of square baled hay or preprocessed round baled hay to be processed. The present invention feed mixer 10 provides a quick, efficient means for mixing large quantities of feed ingredients such as hay bales 74, silage and grains such as corn, thereby creating an end product without damaging fragile feed ingredients due to overexposure of the ingredients to the shredding auger 38, the chopper auger 32 or mixing auger 36.

A drive system (not shown) is enclosed within front wall 16 for rotating rotor 24 and the three augers 32, 36, 38. Any conventional drive system may be used, but it is preferred that the system drive the rotor and the augers in the directions shown by the arrows in FIG. 2. Auger 36 should be rotated to move material in a first longitudinal direction indicated by arrow 100 in FIG. 1 and auger 32 should be rotated to move material in the opposite longitudinal direction indicated by arrow 102 in FIG. 1. Auger 38 preferably should rotate in the same direction as auger 32, and preferably at a faster rotational speed.

It is to be understood that trivial modifications to the combination of elements which comprise the present invention are within the scope of this invention. These modifications would include but are not limited to such things as the longitudinal length of shredding auger 38, chopper auger 32, and the mixing auger 36 and the appropriate mixing chambers to accommodate varying quantities of feed ingredients, the number of sickle knives 42 along the outer edge of the flighting 40, the number of mixing augers 36, or the like. It is to be further understood that the application of the teachings of the present invention to a specific problem or apparatus will be within the capabilities of one having ordinary skill in the art in light of the teachings contained herein.

What is claimed is:

1. A feed mixer comprising:
a housing forming a mixing chamber having opposite end walls, opposite side walls, a bottom wall, and an upwardly facing opening;
a first auger having a helical flighting thereon and being mounted in said mixing chamber for rotation about a first axis;
a second auger having a helical flighting thereon and being mounted in said mixing chamber for rotation about a second axis above said first axis;
a third auger having a helical flighting thereon and being mounted in said mixing chamber for rotation about a third axis above said first and second axes;
a rotor mounted in said mixing chamber for rotation about a rotor axis which is positioned laterally with respect to said first, second, and third axes;
an ingredient feeder positioned adjacent said third auger- and above said first, second, and third axes for feeding ingredients into said chamber at a point adjacent said third auger;
a drive system for rotating said first auger, said second auger, said third auger, and said rotor about their respective first, second, third, and rotor axes, said drive system rotating said third auger at a faster speed than said second auger; and
said mixing chamber comprising a main chamber and an auxiliary chamber positioned in side by side relationship to one another, said rotor being in said main chamber and said first, second, and third augers being in said auxiliary chamber, said upwardly facing opening of said mixing chamber providing a single open upper end above both of said main chamber and said auxiliary chamber.

2. A feed mixer according to claim 1 wherein said flightings of said second and third augers each include an outer edge having a series of knives mounted thereon.

3. A feed mixer according to claim 1 wherein said drive system rotates said first auger in a first direction to move material in a first longitudinal direction in said mixing chamber, and rotates said second auger in a second direction to move material in a second longitudinal direction opposite to said first longitudinal direction in said mixing chamber.

4. A feed mixer according to claim 1 wherein said third axis of said third auger is positioned above and to one side of said second auger, with said flightings of said second and third augers overlapping when viewed from above.

5. A feed mixer according to claim 1 wherein said ingredient feeder comprises an inclined board having an upper edge and having a lower edge positioned adjacent said third auger.

6. A feed mixer according to claim 5 wherein said lower edge of said inclined board is positioned above said first and second augers.

7. A feed mixer according to claim 6 wherein said lower edge of said inclined board is positioned above said third axis of said third auger.

8. A feed mixer according to claim 1 wherein said upwardly facing opening of said mixing chamber included parametric edges which are above and which allow direct vertical access from outside said mixing chamber to said first auger, said second auger, said third auger and said rotor.

9. A feed mixer for creating a mixture of cut hay and at least one additional fluent feed material comprising:
a housing having opposite end walls, opposite side walls, and a bottom wall forming a mixing chamber comprising a main chamber, an auxiliary chamber positioned laterally of said main chamber, and an upwardly presented opening communicating with both said main chamber and said auxiliary chamber;
a first auger having flighting thereon and being rotatably mounted within said auxiliary chamber for rotation about a first auger axis;
a second auger having flighting thereon and being rotatably mounted within said auxiliary chamber for rotation about a second auger axis above said first auger axis;
a third auger having flighting thereon and being rotatably mounted for rotation about a third auger axis above said first and second auger axes;
said third auger and said second auger being positioned relative to one another so that when viewed from above they at least partially overlap one another;
a feed wall having a lower edge positioned closely adjacent to said third auger and being completely above said first and second augers and said rotor for introducing hay to said third auger before said hay falls by gravity to said first and second augers;
a plurality of knives on said helical flightings of said second and third augers for cutting said hay within said auxiliary chamber;
a rotor mounted for rotation within said main chamber for rotation about a rotor axis positioned laterally of said first, second, and third rotor axes;
said rotor and each of said first, second, and third augers being elongated and including opposite ends, said mixing chamber being open and free from barriers between said main chamber and said auxiliary chamber along substantially the entire length of said rotor and said first, second, and third augers;
said rotor having at least one outer radial member which moves in a circular rotor path to first, second, and third positions adjacent said first, second, and third augers during rotation of said rotor about said rotor axis for continuously cycling said mixture from said main chamber to said auxiliary chamber.

10. A feed mixer according to claim 9 and further comprising an ingredient feeder positioned adjacent said third auger and above said first, second, and third axes for feeding ingredients of said feed material into said chamber at a point adjacent said third auger.

11. A method for cutting and mixing hay with at least one additional fluent feed material, said method comprising:
introducing said at least one additional fluent feed material into a mixing chamber formed by a housing having opposite end walls, opposite side walls, and a bottom wall, said mixing chamber having an open upper end and comprising a main chamber and an auxiliary chamber positioned in side-by-side relationship to one another;
using a feed wall having a lower edge to introduce said hay through said open upper end of said mixing chamber into said auxiliary chamber;
chopping said hay with a third auger located below said lower edge of said feed wall in the upper end of said auxiliary chamber, said third auger having flighting thereon and knives mounted on said flighting, and being rotatable about a third auger axis;
permitting said hay to drop by gravity from said third auger to a second auger positioned below said third auger, said second auger having flighting thereon and knives on said flighting and being rotatably mounted within said auxiliary chamber for rotation about a second auger axis below said third auger axis;

permitting said hay to drop by gravity from said second auger to a first auger located within said auxiliary chamber below both said second and third augers;

rotating a rotor within said main chamber about a rotor axis positioned laterally of said first, second, and third augers, said rotor having at least one outer radial member which moves in a circular rotor path to first, second, and third positions adjacent said first, second, and third augers during rotation of said about said rotor axis for continuously cycling said mixture of said hay and said fluent material from said main chamber to said auxiliary chamber.

12. A method according to claim 11 and further comprising using said first auger to move said hay and said fluent feed material in a first direction and using said second auger to move said hay and said fluent material in a second direction opposite from said first direction.

* * * * *